(12) United States Patent
Rao et al.

(10) Patent No.: US 12,449,911 B2
(45) Date of Patent: Oct. 21, 2025

(54) EXTENDED REALITY INTERACTION METHOD AND APPARATUS, ELECTRONIC DEVICE AND STORAGE MEDIUM

(71) Applicant: Beijing Zitiao Network Technology Co., Ltd., Beijing (CN)

(72) Inventors: Xiaolin Rao, Beijing (CN); Chin-Wei Liu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/598,624

(22) Filed: Mar. 7, 2024

(65) Prior Publication Data

US 2024/0302904 A1    Sep. 12, 2024

(30) Foreign Application Priority Data

Mar. 7, 2023    (CN) .......................... 202310219298.4

(51) Int. Cl.
  *G06F 3/01*    (2006.01)
  *G06V 10/77*    (2022.01)
  *G06V 20/20*    (2022.01)
  *G06V 40/20*    (2022.01)

(52) U.S. Cl.
  CPC .............. *G06F 3/017* (2013.01); *G06F 3/013* (2013.01); *G06V 10/7715* (2022.01); *G06V 20/20* (2022.01); *G06V 40/28* (2022.01)

(58) Field of Classification Search
  None
  See application file for complete search history.

(56) References Cited

U.S. PATENT DOCUMENTS

2021/0405760 A1* 12/2021 Schoen ................. G06F 3/0304
2022/0206587 A1   6/2022 Da-Yuan et al.
2022/0365589 A1* 11/2022 Wu ....................... G06F 3/0346

FOREIGN PATENT DOCUMENTS

WO    2021173725 A1    9/2021

OTHER PUBLICATIONS

Extended EP Search Report issued Aug. 9, 2024 in EP Appl. No. 24162196.0 (12 pages).

* cited by examiner

*Primary Examiner* — Brian M Butcher

(57) ABSTRACT

The present disclosure provides an extended reality interaction method and apparatus, an electronic device and a storage medium, the extended reality interaction method includes: acquiring action data of a user in an extended reality scene; determining an action type of the user according to the action data; and triggering a corresponding interaction mode according to the action type, the corresponding interaction mode comprising a handle tracking mode and a bare hand tracking mode, according to the method provided by the present disclosure, an action type of the user is recognized and then a target interaction mode according to the action type is triggered for computing processing, without the need to manually set the interaction mode in advance.

18 Claims, 2 Drawing Sheets

EXTENDED REALITY INTERACTION METHOD AND APPARATUS, ELECTRONIC DEVICE AND STORAGE MEDIUM

CROSS-REFERENCE TO RELATED APPLICATION

The present application claims priority of the Chinese Patent Application No. 202310219298.4, filed on Mar. 7, 2023, the disclosure of which is incorporated herein by reference in the present application.

TECHNICAL FIELD

The present disclosure relates to the technical field of intelligent terminals, and in particular to an extended reality interaction method and apparatus, an electronic device and a storage medium.

BACKGROUND

XR (Extended Reality) devices can support both a handle tracking controller and gesture recognition interaction, but the interaction modes need to be set manually in advance, when the user selects the handle tracking mode, only a handle action can be recognized, and when the user selects gesture recognition, only a gesture action can be recognized.

SUMMARY

The summary is provided to introduce in a simplified form concepts that are further described in detail. The summary is not intended to identify key features or essential features of the claimed technical solution, nor is it intended to be used to limit the scope of the claimed technical solution.

The present disclosure provides an extended reality interaction method and apparatus, an electronic device and a storage medium.

The present disclosure adopts the following technical solutions.

In some embodiments, the present disclosure provides an extended reality interaction method, including:
  acquiring action data of a user in an extended reality scene;
  determining an action type of the user according to the action data;
  triggering a corresponding interaction mode according to the action type, the corresponding interaction mode including a handle tracking mode and a bare hand tracking mode.

In some embodiments, the present disclosure provides an extended reality interaction apparatus, including:
  an acquisition module, configured to acquire action data of a user in an extended reality scene;
  a first processing module, configured to determine an action type of the user according to the action data; and
  a second processing module, configured to trigger a corresponding interaction mode according to the action type, the corresponding interaction mode including a handle tracking mode and a bare hand tracking mode.

In some embodiments, the present disclosure provides a computer-readable storage medium, the computer-readable storage medium being configured for storing program codes which, when executed by a computer device, cause the computer device to perform the method mentioned above.

In some embodiments, the present disclosure provides a computer program product, including instructions which, when executed by a computer device, cause the computer device to perform the method mentioned above.

The extended reality interaction method provided by the embodiment of the present disclosure includes: acquiring action data of a user in an extended reality scene; determining an action type of the user according to the action data; and further triggering a corresponding interaction mode according to the action type, the interaction modes including a handle tracking mode and a bare hand tracking mode. According to the method provided by the present disclosure, by recognizing the action type of the user and then triggering a target interaction mode according to the action type for computing processing, the effects of automatically recognizing whether the user action is the handle action or the gesture action and then automatically triggering interaction processing of the handle tracking mode or the bare hand tracking mode are realized, and the deficiency of low interaction efficiency due to the fact that the interaction mode needs to be manually set in advance is avoided.

BRIEF DESCRIPTION OF DRAWINGS

The above and other features, advantages, and aspects of various embodiments of the present disclosure will become more apparent with reference to the following detailed implementation taken in conjunction with the accompanying drawings. Throughout the drawings, the same or similar reference numbers refer to the same or similar components. It should be understood that the drawings are schematic and that components and elements are not necessarily drawn to scale.

DETAILED DESCRIPTION

Figure 1:
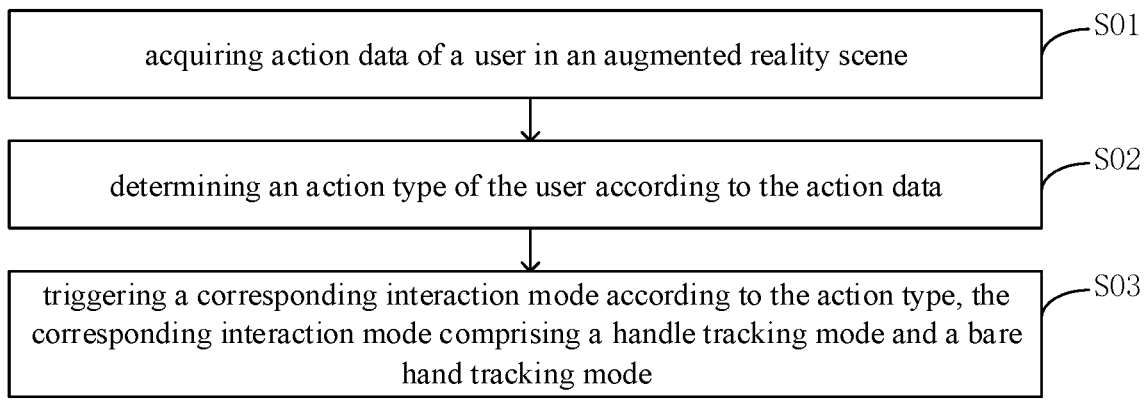
FIG. 1 is a flowchart of an extended reality interaction method according to an embodiment of the present disclosure.

Embodiments of the present disclosure are described in more detail below with reference to the drawings. Although certain embodiments of the present disclosure are shown in the drawings, it should be understood that the present disclosure may be achieved in various forms and should not be construed as being limited to the embodiments described here. On the contrary, these embodiments are provided to understand the present disclosure more clearly and completely. It should be understood that the drawings and the embodiments of the present disclosure are only for exemplary purposes and are not intended to limit the scope of protection of the present disclosure.

It should be understood that various steps recorded in the implementation modes of the method of the present disclosure may be performed according to different orders and/or performed in parallel. In addition, the implementation modes of the method may include additional steps and/or steps omitted or unshown. The scope of the present disclosure is not limited in this aspect.

The term "including" and variations thereof used in this article are open-ended inclusion, namely "including but not limited to". The term "based on" refers to "at least partially based on". The term "one embodiment" means "at least one embodiment"; the term "another embodiment" means "at least one other embodiment"; and the term "some embodiments" means "at least some embodiments". Relevant definitions of other terms may be given in the description hereinafter. The term "in response to" and related terms means that one signal or event is affected by another signal or event to some extent, but is not necessarily completely or directly be affected. If event x occurs "in response to" event y, x may respond to y, directly or indirectly. For example, the occurrence of y may eventually lead to the occurrence of x, but there may be other intermediate events and/or conditions. In other cases, y may not necessarily cause x to occur, and x may occur even if y has not occurred. Furthermore, the term "in response to" may also mean "at least partially in response to".

The term "determine" broadly encompasses a wide variety of actions, which may include acquiring, calculating, computing, processing, deriving, investigating, looking up (for example, in a table, database, or other data structure), ascertaining, and similar actions, further include receiving (for example, receiving information), accessing (for example, accessing data in memory), and similar actions, as well as parsing, choosing, selecting, creating, and similar actions, and the like. Relevant definitions of other terms will be given in the description below. Relevant definitions of other terms will be given in the description below.

It should be noted that concepts such as "first" and "second" mentioned in the present disclosure are only used to distinguish different apparatuses, modules or units, and are not intended to limit orders or interdependence relationships of functions performed by these apparatuses, modules or units.

It should be noted that modifications of "one" and "more" mentioned in the present disclosure are schematic rather than restrictive, and those skilled in the art should understand that unless otherwise explicitly stated in the context, it should be understood as "one or more".

The names of messages or information exchanged between multiple devices in the present disclosure are used for illustrative purposes only and are not used to limit the scope of the messages or the information.

Hereinafter, solutions provided by embodiments of the present disclosure will be described in detail with reference to the attached drawings.

As shown in FIG. 1, FIG. 1 is a flowchart of an extended reality interaction method in an embodiment of the present disclosure, including the following steps.

Step S01: acquiring action data of a user in an extended reality scene;

In some embodiments, it should be noted that computing processing resources occupied by the handle tracking controller and the gesture recognition interaction are relatively large on the extended reality device, thus the processing of the handle tracking controller and the computing processing of the gesture recognition interaction adopt exclusive OR processing, that is, when a current system is carrying out the handle tracking interaction, a processing module of the gesture recognition interaction will be suspended by the system, or when the current system is carrying out the gesture recognition interaction, a processing module of the handle tracking interaction will be suspended by the system. For example, if a user wants to perform gesture recognition when holding the handle tracking controller, the user needs to put down the handle and stand still before making the gesture action, or operates the handle tracking controller to switch to the bare hand tracking mode before making the gesture action. It can be seen that physical switching interaction modes provided by the related arts are low in efficiency and poor in user experience. Therefore, in order to solve this problem, the present disclosure provides an extended reality interaction method, including: firstly, acquiring action data of a user when using an extended reality device, the action data including an action image and pose data of the user. A device for collecting the action image of the user may be a trichromatic camera, a depth camera, an infrared camera, etc. A device for collecting the pose data of the user may be an environment tracking camera, which is used to acquire six-degree-of-freedom positioning information of the extended reality device relative to a physical environment where it is located.

Step S02: determining an action type of the user according to the action data;

In some embodiments, after the action data of the user in the extended reality scene is acquired, the action type of the user is determined according to the action data. Specifically, a reinforcement learning model may be used to identify the action of the user, and a template matching method may also be used to determine the action type of the user. The action types include a handle action and a gesture action.

Step S03: triggering a corresponding interaction mode according to the action type, the corresponding interaction mode including a handle tracking mode and a bare hand tracking mode.

In some embodiments, after the action type of the user is determined, the corresponding interaction mode is triggered according to the action type. For example, if the action type is a handle action, the handle tracking mode is triggered and a corresponding action instruction is executed; if the action type is a gesture action, the bare hand tracking mode is triggered and a corresponding action instruction is executed.

The extended reality interaction method provided by the embodiment of the present disclosure includes: acquiring action data of a user in an extended reality scene; determining an action type of the user according to the action data; and further triggering a corresponding interaction mode according to the action type, the corresponding interaction mode including a handle tracking mode and a bare hand tracking mode. According to the method provided by the present disclosure, by recognizing the action type of the user and then triggering a target interaction mode according to the action type for computing processing, the effects of automatically recognizing whether the user action is the handle action or the gesture action and then automatically triggering interaction processing of the handle tracking mode or the bare hand tracking mode are realized, and the deficiency of low interaction efficiency due to the fact that the interaction mode needs to be manually set in advance is avoided.

In some embodiments, the acquiring action data of a user in an extended reality scene includes:

acquiring a series of action data made by the user during a preset time period, the action data including an action image and pose data.

In some embodiments, the action data includes, but not limited to, movements of one or more fingers, turning of a wrist, lifting of an arm, and the like. The action data may further include an eye action and actions of other body parts of the user.

In some embodiments, the determining an action type of the user according to the action data includes:

inputting the action image and the pose data into a recognition model, and outputting the action type, where the recognition model is obtained by training a reinforcement learning model based on the action image and the pose data as input data and the action type as output data.

In some embodiments, a training mode of the reinforcement learning model may refer to training modes of related arts, and will not be repeated here.

In some embodiments, the action type include a handle action and a gesture action.

In some embodiments, the action types may further include an eye action and actions of other body parts, which are not specifically limited here.

In some embodiments, the determining an action type of the user according to the action data further includes:
  determining an action posture of the user according to the action data; and
  matching the action posture with a preset action template to determine the action type of the user.

In some embodiments, the action template may be pre-stored locally, or the action data may be sent to a cloud server by the extended reality device and matching processing is performed according to an action template pre-stored in the cloud server.

In some embodiments, the triggering a corresponding interaction mode according to the action type includes:
  generating an interaction control instruction according to the action type; and
  triggering the corresponding interaction mode for computing processing according to the interaction control instruction.

In some embodiments, the interaction control instruction is first generated according to the action type. For example, if the action type is the handle action, the generated interaction control instruction is a handle interaction control instruction; if the action type is the gesture action, the generated interaction control instruction is a gesture interaction control instruction. Further, the corresponding handle tracking module or the bare hand tracking module is triggered according to the generated handle interaction control instruction or gesture interaction control instruction, so as to automatically judge whether the user action belongs to the handle action or the gesture action, and automatically trigger the corresponding interaction mode without interrupting a current operation and then switching the interaction mode by the user. It can be seen that the extended reality interaction method provided by the embodiment of the present disclosure can implement non-inductive switching for the user in a process of using the extended reality device.

In some embodiments, in the extended reality scene, when a user looks for something on a table with both hands, action postures of the both hands of the user are collected and matched with a preset action template, the action type is determined as the gesture action, the bare hand tracking mode is started according to the gesture action, an action intention of the user is determined through the computing processing of the bare hand tracking mode, and an interaction result is fed back. For example, if the object sought by the user is recognized as a handle controller, a position of the handle controller can be fed back to the user. For another example, if the object sought by the user is recognized as a virtual object, a position of the virtual object can be fed back to the user.

In some embodiments,
  the handle tracking mode includes: enabling a handle to be in communication connection with an extended reality device, and performing extended reality interaction through the handle; and
  the bare hand tracking mode includes: collecting and identifying a gesture action and tracking information of the bare hand, and performing extended reality interaction through the gesture action and the tracking information.

In some embodiments, the action template includes at least one of a handle posture, a bare hand posture, a handle movement trajectory, a bare hand movement trajectory, a finger movement trajectory and a hand speed.

In some embodiments, the interaction control instruction includes switching the interaction mode and displaying a state of a virtual object and/or a state of a real object in the extended reality scene.

In some embodiments, the state of the virtual object or the state of the real object includes one or more of a position, a size and a shape.

In some embodiments,
  the interaction mode further includes an eye tracking mode, and the eye tracking mode includes: collecting and identifying an eye action feature, and performing the extended reality interaction through the eye action feature; and
  correspondingly, the action type further includes an eye action.

Figure 2:
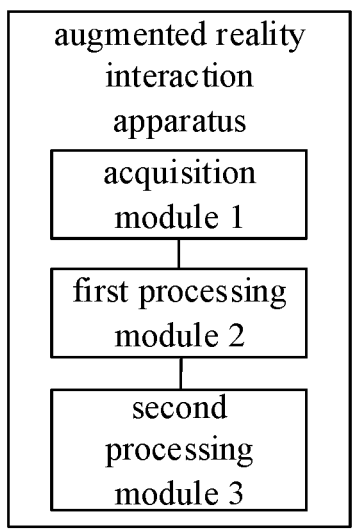
FIG. 2 is a schematic diagram of a structure of an extended reality interaction apparatus according to an embodiment of the present disclosure.

As shown in FIG. 2, an embodiment of the present disclosure further provides an extended reality interaction apparatus, including:
  an acquisition module 1, configured to acquire action data of a user in an extended reality scene;
  a first processing module 2, configured to determine an action type of the user according to the action data; and
  a second processing module 3, configured to trigger a corresponding interaction mode according to the action type, the corresponding interaction mode including a handle tracking mode and a bare hand tracking mode.

In some embodiments, the acquisition module is specifically configured to:
  acquire a series of action data made by the user during a preset time period, the action data including an action image and pose data.

In some embodiments, the first processing module is specifically configured to:
  input the action image and the pose data into a recognition model, and output the action type,
  where the recognition model is obtained by training a reinforcement learning model based on the action image and the pose data as input data and the action type as output data.

In some embodiments, the action type include a handle action and a gesture action.

In some embodiments, the first processing module is further specifically configured to:
  determine an action posture of the user according to the action data; and
  match the action posture with a preset action template to determine the action type of the user.

In some embodiments, the second processing module is specifically configured to:
  generate an interaction control instruction according to the action type; and
  trigger the corresponding interaction mode for computing processing according to the interaction control instruction.

In some embodiments, the handle tracking mode includes: enabling a handle to be in communication connection with an extended reality device, and performing extended reality interaction through the handle; and the bare hand tracking mode includes: collecting and identifying a gesture action and tracking information of the bare hand, and performing extended reality interaction through the gesture action and the tracking information.

In some embodiments, the action template includes at least one of a handle posture, a bare hand posture, a handle movement trajectory, a bare hand movement trajectory, a finger movement trajectory and a hand speed.

In some embodiments, the interaction control instruction includes switching the interaction mode and displaying a state of a virtual object and/or a state of a real object in the extended reality scene.

In some embodiments, the state of the virtual object or a state of the real object includes one or more of a position, a size and a shape.

In some embodiments, the interaction mode further includes an eye tracking mode, and the eye tracking mode includes: collecting and identifying an eye action feature, and performing the extended reality interaction through the eye action feature; and correspondingly, the action type further includes an eye action.

For the apparatus embodiment, because it basically corresponds to the method embodiment, reference may be made to the partial description of the method embodiment for relevant points. The apparatus embodiments described above are only schematic, in which the modules described as separate modules may or may not be separate. Some or all of the modules may be selected according to actual needs to achieve the objective of the implementation. One of ordinary skill in the art can understand and implement without inventive effort.

The method and apparatus of the present disclosure have been described above based on the embodiments and application examples. In addition, the present disclosure further provides an electronic device and a computer-readable storage medium, which are described below.

Figure 3:
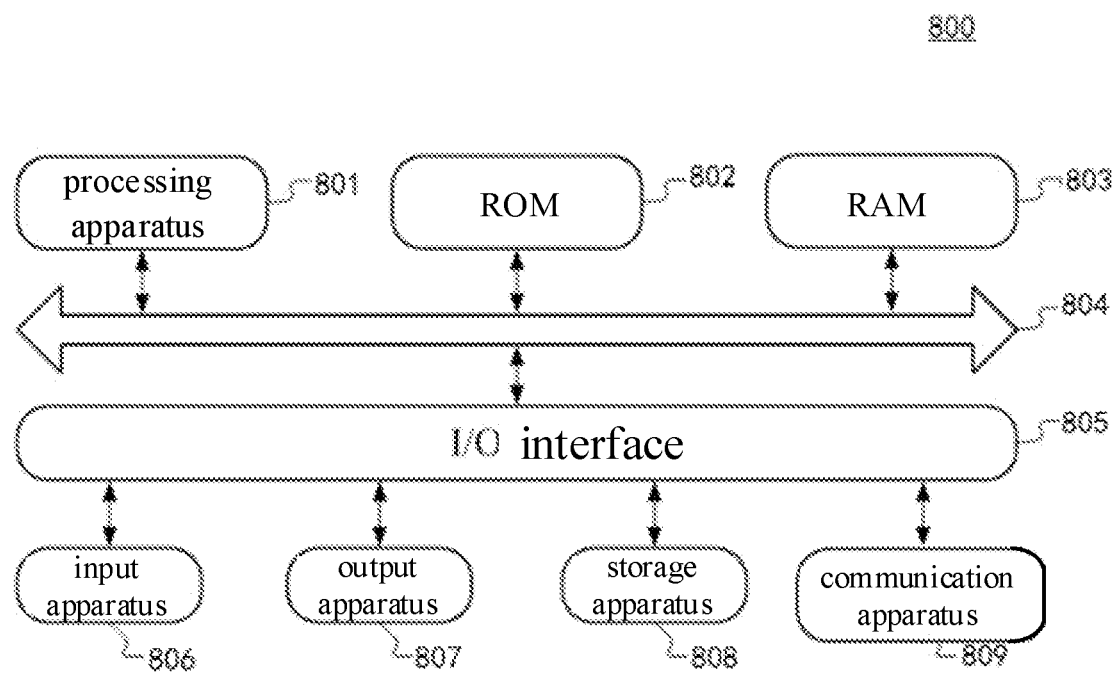
FIG. 3 is a schematic diagram of a structure of an electronic device according to an embodiment of the present disclosure.

Reference is now made to FIG. 3, which shows a schematic diagram of a structure of an electronic device (for example, a terminal device or a server) 800 suitable for implementing some embodiments of the present disclosure. The terminal devices in some embodiments of the present disclosure may include, but are not limited to, mobile terminals such as a mobile phone, a notebook computer, a digital broadcasting receiver, a personal digital assistant (PDA), a portable Android device (PAD), a portable media player (PMP), a vehicle-mounted terminal (for example, a vehicle-mounted navigation terminal) and the like, and fixed terminals such as a digital TV, a desktop computer and the like. The electronic device shown in the figure is only an example, and should not pose any limitation to the functions and the scope of use of the embodiments of the present disclosure.

The electronic device 800 may include a processing apparatus (for example, a central processing unit, a graphics processing unit and the like) 801, which may perform various suitable actions and processes according to a program stored in a read-only memory (ROM) 802 or a program loaded from a storage apparatus 808 into a random-access memory (RAM) 803. In the RAM 803, various programs and data required for operations of the electronic device 800 are further stored. The processing apparatus 801, the ROM 802 and the RAM 803 are interconnected by means of a bus 804. An input/output (I/O) interface 805 is also connected to the bus 804.

Generally, the following apparatuses may be connected to the I/O interface 805: an input apparatus 806 including, for example, a touch screen, a touch pad, a keyboard, a mouse, a camera, a microphone, an accelerometer, a gyroscope, etc.; an output apparatus 807 including, for example, a liquid crystal display (LCD), a loudspeaker, a vibrator, etc.; a storage apparatus 808 including, for example, a magnetic tape, a hard disk, etc.; and a communication apparatus 809. The communication apparatus 809 may allow the electronic device 800 to perform wireless or wired communication with other devices to exchange data. While the electronic device 800 with various apparatuses is shown in the figure, it should be understood that it is not required to implement or have all the apparatuses shown. More or fewer apparatuses may alternatively be implemented or provided.

In particular, according to the embodiments of the present disclosure, the processes described above with reference to the flowcharts may be implemented as a computer software program. For example, an embodiment of the present disclosure includes a computer program product, which includes a computer program carried by a computer-readable medium, the computer program includes program codes for performing the method shown in the flowchart. In such an embodiment, the computer program may be downloaded and installed from a network through the communication apparatus 809, or installed from the storage apparatus 808, or installed from the ROM 802. When the computer program is executed by the processing apparatus 801, the above-mentioned functions defined in the method of the embodiment of the present disclosure are performed.

It should be noted that the computer-readable medium mentioned above in the present disclosure may be a computer-readable signal medium or a computer-readable storage medium or any combination thereof. The computer-readable storage medium may be, for example, but not limited to, an electrical, magnetic, optical, electromagnetic, infrared, or semiconductor system, apparatus or device, or any combination thereof. More specific examples of the computer-readable storage medium may include, but not limited to: an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above. In the present disclosure, the computer-readable storage medium may be any tangible medium containing or storing a program that may be used by or in combination with an instruction execution system, apparatus or device. In the present disclosure, the computer-readable signal medium may include a data signal propagated in a baseband or as a part of a carrier wave, in which computer-readable program codes are carried. This propagated data signal may take multiple forms, including but not limited to an electromagnetic signal, an optical signal or any suitable combination of the above. The computer-readable signal medium may also be any computer-readable medium other than the computer-readable storage medium, and may send, propagate or transmit a program used by or in combination with an instruction execution system, apparatus or device. The program codes contained on the computer-readable medium may be transmitted by any suitable medium, including but not limited to: an electric wire, a fiber-optic cable, radio frequency (RF) and the like, or any suitable combination of the above.

In some implementation methods, a client and the server can communicate by using any currently known or future developed network protocol such as a hypertext transfer protocol (HTTP), and may communicate and interconnect with digital data in any form or medium (for example, a communication network). Examples of the communication network include a local area network ("LAN"), a wide area network ("WAN"), the Internet work (for example, the Internet) and an end-to-end network (for example, an ad hoc end-to-end network), as well as any currently known or to be researched and developed in the future.

The computer-readable medium described above may be included in the above-mentioned electronic device; or it may exist alone without being assembled into the electronic device.

The computer-readable medium described above carries one or more programs, which, when executed by the electronic device, cause the electronic device to perform the method of the present disclosure.

Computer program codes for performing the operations of the present disclosure may be written in one or more programming languages or a combination thereof, including object-oriented programming languages such as Java, Smalltalk and C++, and also include conventional procedural programming languages such as "C" programming language or similar programming languages. The program codes may be entirely executed on a user's computer, partially executed on the user's computer, executed as an independent software package, partially executed on the user's computer and partially executed on a remote computer, or entirely executed on the remote computer or a server. In the case involving the remote computer, the remote computer may be connected to the user's computer through any type of network, including a local area network (LAN) or a wide area network (WAN), or may be connected to an external computer (for example, through the Internet using an Internet service provider).

The flowcharts and block diagrams in the accompanying drawings illustrate the architecture, function and operation of possible implementations of the systems, methods and the computer program product according to various embodiments of the present disclosure. In this regard, each block in the flowcharts or block diagrams may represent a module, a program segment, or a part of codes, which includes one or more executable instructions for implementing specified logical functions. It should also be noted that, in some alternative implementations, the functions noted in the blocks may occur out of the order noted in the accompanying drawings. For example, two blocks shown in succession may, in fact, be executed substantially in parallel, and may sometimes be executed in a reverse order, depending on the function involved. It should also be noted that, each block in the block diagrams and/or flowcharts, and combinations of blocks in the block diagrams and/or flow diagrams, may be implemented by a dedicated hardware-based system that performs specified functions or operations, or by a combination of dedicated hardware and computer instructions.

The units involved in the embodiments described in the present disclosure may be implemented by software or hardware. Among them, the name of the unit does not constitute a limitation on the unit itself in some cases.

The functions described above herein may be at least partially performed by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logic device (CPLD) and the like.

In the context of the present disclosure, the machine-readable medium may be a tangible medium that may include or store a program used by or in connection with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the above. More specific examples of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above.

According to one or more embodiments of the present disclosure, an extended reality interaction method is provided, including:
  acquiring action data of a user in an extended reality scene;
  determining an action type of the user according to the action data;
  triggering a corresponding interaction mode according to the action type, the corresponding interaction mode including a handle tracking mode and a bare hand tracking mode.

According to one or more embodiments of the present disclosure, a method is provided, where the acquiring action data of a user in an extended reality scene includes:
  acquiring a series of action data made by the user during a preset time period, the action data including an action image and pose data.

According to one or more embodiments of the present disclosure, a method is provided, where the determining an action type of the user according to the action data includes:
  inputting the action image and the pose data into a recognition model, and outputting the action type,
  where the recognition model is obtained by training a reinforcement learning model based on the action image and the pose data as input data and the action type as output data.

According to one or more embodiments of the present disclosure, a method is provided, and the action type include a handle action and a gesture action.

According to one or more embodiments of the present disclosure, a method is provided, where the determining an action type of the user according to the action data further includes:
  determining an action posture of the user according to the action data; and
  matching the action posture with a preset action template to determine the action type of the user.

According to one or more embodiments of the present disclosure, a method is provided, and the triggering a corresponding interaction mode according to the action type includes:
  generating an interaction control instruction according to the action type; and
  triggering the corresponding interaction mode for computing processing according to the interaction control instruction.

According to one or more embodiments of the present disclosure, a method is provided, where
the handle tracking mode includes: enabling a handle to be in communication connection with an extended reality device, and performing extended reality interaction through the handle; and
the bare hand tracking mode includes: collecting and identifying a gesture action and tracking information of the bare hand, and performing extended reality interaction through the gesture action and the tracking information.

According to one or more embodiments of the present disclosure, a method is provided, where the action template includes at least one of a handle posture, a bare hand posture, a handle movement trajectory, a bare hand movement trajectory, a finger movement trajectory and a hand speed.

According to one or more embodiments of the present disclosure, a method is provided, where the interaction control instruction includes switching the interaction mode and displaying a state of a virtual object and/or a state of a real object in the extended reality scene.

According to one or more embodiments of the present disclosure, a method is provided, where the state of the virtual object or the state of the real object includes one or more of a position, a size and a shape.

According to one or more embodiments of the present disclosure, a method is provided, where
the interaction mode further includes an eye tracking mode, and the eye tracking mode includes: collecting and identifying an eye action feature, and performing the extended reality interaction through the eye action feature; and
correspondingly, the action type further includes an eye action.

According to one or more embodiments of the present disclosure, an extended reality interaction apparatus is provided, including:
an acquisition module, configured to acquire action data of a user in an extended reality scene;
a first processing module, configured to determine an action type of the user according to the action data; and
a second processing module, configured to trigger a corresponding interaction mode according to the action type, the corresponding interaction mode including a handle tracking mode and a bare hand tracking mode.

According to one or more embodiments of the present disclosure, an electronic device is provided, including: at least one memory and at least one processor;
where the at least one memory is configured to store program codes, and the at least one processor is configured to invoke the program codes stored in the at least one memory to perform any one of the methods described above.

According to one or more embodiments of the present disclosure, a computer-readable storage medium is provided for storing program codes which, when executed by a processor, cause the processor to perform the method described above.

The foregoing are merely descriptions of the preferred embodiments of the present disclosure and the explanations of the technical principles involved. It will be appreciated by those skilled in the art that the scope of the disclosure involved herein is not limited to the technical solutions formed by a specific combination of the technical features described above, and shall cover other technical solutions formed by any combination of the technical features described above or equivalent features thereof without departing from the concept of the present disclosure. For example, the technical features described above may be mutually replaced with the technical features having similar functions disclosed herein (but not limited thereto) to form new technical solutions.

In addition, while operations have been described in a particular order, it shall not be construed as requiring that such operations are performed in the stated specific order or sequence. Under certain circumstances, multitasking and parallel processing may be advantageous. Similarly, while some specific implementation details are included in the above discussions, these shall not be construed as limitations to the present disclosure. Some features described in the context of a separate embodiment may also be combined in a single embodiment. Rather, various features described in the context of a single embodiment may also be implemented separately or in any appropriate sub-combination in a plurality of embodiments.

Although the present subject matter has been described in a language specific to structural features and/or logical method acts, it will be appreciated that the subject matter defined in the appended claims is not necessarily limited to the particular features and acts described above. Rather, the particular features and acts described above are merely exemplary forms for implementing the claims.

The invention claimed is:

1. An extended reality interaction method, comprising:
acquiring action data of a user in an extended reality scene;
determining an action type of the user according to the action data; and
triggering a corresponding interaction mode according to the action type, the corresponding interaction mode comprising a handle tracking mode and a bare hand tracking mode,
wherein the acquiring action data of a user in an extended reality scene comprises:
acquiring a series of action data made by the user during a preset time period, wherein the action data comprises an action image and pose data, and both the action image and the pose data are used to determine the action type of the user.

2. The method according to claim 1, wherein the determining an action type of the user according to the action data comprises:
inputting the action image and the pose data into a recognition model, and outputting the action type,
wherein the recognition model is obtained by training a reinforcement learning model based on the action image and the pose data as input data and the action type as output data.

3. The method according to claim 1, wherein the action type comprises a handle action and a gesture action.

4. The method according to claim 1, wherein the determining an action type of the user according to the action data further comprises:
determining an action posture of the user according to the action data; and
matching the action posture with a preset action template to determine the action type of the user.

5. The method according to claim 1, wherein the triggering a corresponding interaction mode according to the action type comprises:
generating an interaction control instruction according to the action type; and triggering the corresponding interaction mode for computing processing according to the interaction control instruction.

6. The method according to claim 1, wherein
the handle tracking mode comprises: enabling a handle to be in communication connection with an extended reality device, and performing extended reality interaction through the handle; and
the bare hand tracking mode comprises: collecting and identifying a gesture action and tracking information of the bare hand, and performing extended reality interaction through the gesture action and the tracking information.

7. The method according to claim 4, wherein the action template comprises at least one of a handle posture, a bare hand posture, a handle movement trajectory, a bare hand movement trajectory, a finger movement trajectory and a hand speed.

8. The method according to claim 5, wherein the interaction control instruction comprises: switching the interaction mode; and displaying a state of a virtual object and/or a state of a real object in the extended reality scene.

9. The method according to claim 8, wherein the state of the virtual object or the state of the real object comprises one or more of a position, a size and a shape.

10. The method according to claim 3, wherein
the interaction mode further comprises an eye tracking mode, and the eye tracking mode comprises: collecting and identifying an eye action feature, and performing the extended reality interaction through the eye action feature; and
correspondingly, the action type further comprises an eye action.

11. An electronic device, comprising:
at least one memory; and
at least one processor;
wherein the at least one memory is configured to store program codes, and the at least one processor is configured to invoke the program codes stored in the at least one memory to perform:
acquiring action data of a user in an extended reality scene;
determining an action type of the user according to the action data; and
triggering a corresponding interaction mode according to the action type, the corresponding interaction mode comprising a handle tracking mode and a bare hand tracking mode,
wherein the at least one processor is configured to invoke the program codes stored in the at least one memory further to perform:
acquiring a series of action data made by the user during a preset time period, wherein the action data comprises an action image and pose data, and both the action image and the pose data are used to determine the action type of the user.

12. The electronic device according to claim 11, wherein the at least one processor is configured to invoke the program codes stored in the at least one memory further to perform:
inputting the action image and the pose data into a recognition model, and outputting the action type,
wherein the recognition model is obtained by training a reinforcement learning model based on the action image and the pose data as input data and the action type as output data.

13. The electronic device according to claim 11, wherein the action type comprises a handle action and a gesture action.

14. The electronic device according to claim 11, wherein the at least one processor is configured to invoke the program codes stored in the at least one memory further to perform:
determining an action posture of the user according to the action data; and
matching the action posture with a preset action template to determine the action type of the user.

15. The electronic device according to claim 11, wherein the at least one processor is configured to invoke the program codes stored in the at least one memory further to perform:
generating an interaction control instruction according to the action type; and
triggering the corresponding interaction mode for computing processing according to the interaction control instruction.

16. The electronic device according to claim 11, wherein
the handle tracking mode comprises: enabling a handle to be in communication connection with an extended reality device, and performing extended reality interaction through the handle; and
the bare hand tracking mode comprises: collecting and identifying a gesture action and tracking information of the bare hand, and performing extended reality interaction through the gesture action and the tracking information.

17. The electronic device according to claim 15, wherein the interaction control instruction comprises: switching the interaction mode; and displaying a state of a virtual object and/or a state of a real object in the extended reality scene.

18. A non-transitory computer-readable storage medium, the non-transitory computer-readable storage medium being configured for storing program codes which, when executed by a computer device, cause the computer device to perform the method according to claim 1.

* * * * *